(12) United States Patent
Klim et al.

(10) Patent No.: US 7,266,518 B2
(45) Date of Patent: Sep. 4, 2007

(54) SPARE PARTS INVENTORY MANAGEMENT

(75) Inventors: Thomas R. Klim, Neenah, WI (US); Monty Griffin, Combined Locks, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 31 days.

(21) Appl. No.: 11/321,759

(22) Filed: Dec. 29, 2005

(65) Prior Publication Data
US 2007/0156543 A1 Jul. 5, 2007

(51) Int. Cl.
*G06F 19/00* (2006.01)
*G06Q 10/00* (2006.01)

(52) U.S. Cl. .................. 705/28; 700/107; 700/117; 700/236

(58) Field of Classification Search ........ 700/107, 700/117, 236; 705/28
See application file for complete search history.

(56) References Cited

U.S. PATENT DOCUMENTS

| | | | |
|---|---|---|---|
| 4,457,772 A | 7/1984 | Haynes et al. | |
| 4,803,634 A | 2/1989 | Ohno et al. | |
| 5,216,612 A | 6/1993 | Cornett et al. | |
| 5,712,989 A * | 1/1998 | Johnson et al. | 705/28 |
| 5,819,232 A * | 10/1998 | Shipman | 705/8 |
| 6,182,053 B1 * | 1/2001 | Rauber et al. | 705/28 |
| 6,671,673 B1 | 12/2003 | Baseman et al. | |
| 6,865,434 B1 * | 3/2005 | Lin et al. | 700/108 |
| 2002/0077850 A1 * | 6/2002 | McMenimen et al. | 705/2 |
| 2003/0055753 A1 | 3/2003 | Dellar et al. | |
| 2003/0101107 A1 * | 5/2003 | Agarwal et al. | 705/28 |
| 2003/0110104 A1 * | 6/2003 | King et al. | 705/28 |
| 2003/0158795 A1 | 8/2003 | Markham et al. | |
| 2005/0065858 A1 | 3/2005 | Tenzer et al. | |
| 2005/0102203 A1 | 5/2005 | Keong | |
| 2005/0159971 A1 * | 7/2005 | Woehler | 705/1 |
| 2005/0216366 A1 * | 9/2005 | Vincent et al. | 705/28 |
| 2006/0089867 A1 * | 4/2006 | Sakuma et al. | 705/8 |

FOREIGN PATENT DOCUMENTS

EP   1251656 A1   10/2002

OTHER PUBLICATIONS

Abstract of Japanese Patent No. JP2003122866, Apr. 25, 2003.
Abstract of Japanese Patent No. JP2003242270, Aug. 29, 2003.
Abstract of Japanese Patent No. JP2004062801, Feb. 26, 2004.

* cited by examiner

*Primary Examiner*—Leo Picard
*Assistant Examiner*—Sheela Rao
(74) *Attorney, Agent, or Firm*—Dority & Manning, P.A.

(57) ABSTRACT

A method for managing spare parts and tools for a manufacturing enterprise is disclosed. Historical demand values are statistically analyzed to determine optimal stocking levels for spare parts based upon required availability percentages, parts lead times, and the statistical distribution parts demand levels. Parts stocking decisions can also be based upon planned and preventative maintenance timeframes with such parts ordered on an as-needed basis in accordance with lead times. Spare parts inventory management can utilize an enterprise-wide computer system to integrate parts demand planning with systems used for engineering and other changes to manufacturing processes and facility maintenance systems. The computer system can perform varying degrees of the parts reordering and planning process and automate certain steps while providing for decision of other issues by parts management personnel.

25 Claims, 3 Drawing Sheets

SPARE PARTS INVENTORY MANAGEMENT

BACKGROUND OF THE INVENTION

For as long as manufacturing processes have existed, there has been a need for spare and replacement parts. Modern manufacturing processes may comprise thousands of discrete parts and subassemblies, each of which will eventually require repair or replacement depending upon a myriad of factors such as the intensity of use and environmental considerations. Process maintenance is crucial to profitability for manufacturing enterprises, and entails scheduling for maintenance and repairs, and providing that adequate parts and tools will be available to carry out such repairs in an expeditious fashion. Additionally, sufficient parts must be available for unplanned parts replacements.

Modern manufacturing enterprises utilize many processes operating at facilities scattered across the globe. Furthermore, the aggregate value of spare parts purchased and held in inventory to support such enterprises can reach into the hundreds of millions of dollars. Mismanagement of spare parts inventory carries two great risks: if spare part stocks are inadequate, then the manufacturing processes cannot operate at full profit potential; on the other hand, excess inventory of unneeded spare parts represents a misapplication of capital that could be otherwise used in a more effective manner.

Despite the pressures for effective inventory management, some manufacturing facilities which are part of a multi-facility enterprise still manage spare parts independently of one another. This is due to a number of factors, including the fact that oftentimes facilities will use differing processes that identify the same parts under differing designations. Other enterprises may utilize a central repository of spare parts that are distributed to facilities which keep their own stock of certain parts, but part levels are managed based upon set stocking requirements, without consideration of actual parts demand, availability of parts outside the central store, the dynamic nature of parts requirements, or capital investment implications. Accordingly, there is a need for an integrated parts management system to more accurately determine spare parts ordering and distribution needs for multi-facility enterprises that takes such factors into account.

One measure of the effectiveness of spare parts management is referred to as the "turns ratio," which is found by taking the usage of spare parts inventory over a given time period and dividing by the inventory stock level for that period. A higher turns ratio results from an increase in the amount of parts usage relative to parts kept in stock, and is indicative of more effective parts management than a lower turns ratio. For typical large-scale manufacturing enterprises, the turns ratio for spare parts inventory is around 1 or lower. Enterprises have increased turns ratios for sales inventory management, but have not achieved consummate increases in the turns ratio for management of internal inventories for spare parts and the like.

Manufacturing enterprises can use enterprise resource planning and accounting systems such as SAP® to track manufacturing asset history and costs. Additional computer systems may be used in the design and revision of manufacturing processes. However, these existing systems are not optimized for spare parts management.

SUMMARY OF THE INVENTION

A method for managing enterprise-wide component inventory can include the steps of identifying a plurality of components, each of which is either a spare part or tool used in support of a manufacturing process; maintaining at least one inventory store of the components, which can include both central hub and facility-based parts storage; calculating an enterprise-wide demand plan for each of the components; and adjusting the number of the component maintained in the inventory store based upon the demand plan. The adjustment can include issuing or changing purchase orders for spare parts, transferring spare parts between facilities, or selling excess spare parts.

Calculating the demand plan can take into account changes made in process parts requirements by engineering personnel, such as the addition or deletion of parts or entire processes. When use of a part is discontinued, the demand plan can be calculated to run out existing inventory stocks to the fullest degree possible, and when a new part is added, the plan can include consideration of lead times to ensure spare parts are available when the new part comes on-line. The method can also account for parts changes due to other factors such as original equipment manager (OEM) changes.

The demand plan can be calculated based upon statistically-derived safety stock considerations based upon historical demand patterns so that sufficient stores of parts are maintained to satisfy breakdown demand for parts during lead time for reordering the parts in accordance with a specified parts availability requirement. The demand plan can provide for non-breakdown demand satisfaction through parts ordering in accordance with planned or preventative maintenance determinations for parts replacements. The demand values can be identified using data associated with an enterprise resource planning computer system.

Historical usage of components can be tracked, including tracking data regarding individual components such as repair history and location. The parts can be tracked using barcodes, RFID chips, or other identification indicia.

A method for managing enterprise-wide component inventory may include monitoring at least one identification device associated with a component, the component comprising a spare part or tool used in support of a manufacturing process, determining a physical location of the component in response to the monitoring, and adjusting inventory data for the component based upon the location of the component.

The step of monitoring can include scanning an RFID tag associated with a component that is in use in a manufacturing process or components in storage.

A method for managing enterprise-wide component inventory may also include identifying a plurality of components, each comprising a part or tool used in support of at least one manufacturing process, maintaining warranty data for each component, evaluating component status based component data, including the history of the component and the warranty data, providing for repair in accordance with the warranty data for each component if warranty coverage is available. The step of providing for repair can include generating repair request and shipping documents for the component to a repair service provider when warranty coverage is available.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures, in which.

Figure 1:
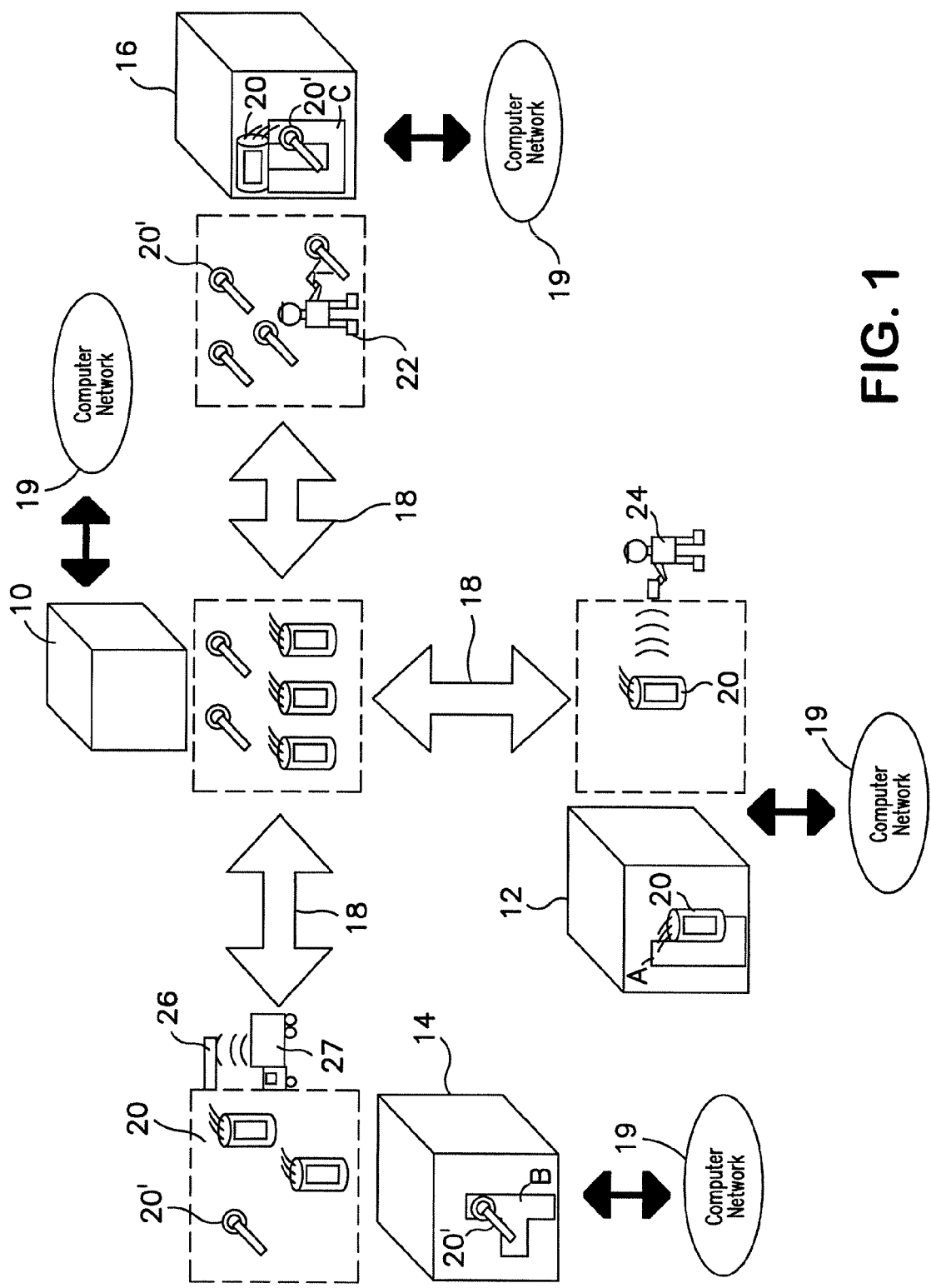
FIG. 1. illustrates a representative arrangement of manufacturing facilities operated in accordance with the spare parts management system and methodologies disclosed herein.

Repeat use of reference characters in the present specification and drawings is intended to represent same or analogous features or elements of the invention.

DETAILED DESCRIPTION OF THE INVENTION

Reference will now be made in detail to present embodiments of a spare parts inventory management system, one or more examples of which are illustrated in the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the spare parts inventory management system disclosed herein includes modifications and variations as come within the scope of the appended claims and their equivalents.

Manufacturing Facility Topology

FIG. 1 illustrates an exemplary arrangement of facilities 10, 12, 14, and 16. Each facility may comprise one or multiple buildings in which manufacturing processes A, B, and C, or parts thereof, are carried out. The illustrated facilities are for example only; the methods of the present subject matter may be practiced with more or fewer facilities than are illustrated in FIG. 1. Each facility may house a number of the same, or different, manufacturing processes. In one embodiment, as illustrated in FIG. 1 at facility 10, the enterprise maintains one or more parts warehouses where no manufacturing processes are actually operated. The parts warehouses may be utilized as central stores to provide parts to a number of facilities in a single- or multi-tier hub and spoke arrangement. Alternatively, facilities with active manufacturing processes can serve as hubs, with other manufacturing process facilities serving as spokes. The facilities may be physically located any distance from one another, and are linked to an enterprise-wide computer network 19. Parts and materials transport network 18 provides transportation and logistical support via truck, rail, air, and other transportation means.

Each facility has associated with it a spare parts inventory store or stores, shown by the dotted lines, which represent stocks of spare parts maintained at the facilities. As illustrated in FIG. 1, two exemplary spare parts types 20 and 20' are shown for ease of explanation. Although FIG. 1 depicts only two spare parts types, a spare parts inventory management system as disclosed herein can be used with any number of parts, including the multiple thousands of spare parts that are commonly needed in modern manufacturing processes. Additionally, as used herein, the term "spare parts" includes any other components used in support of manufacturing processes exclusive of the product or materials produced or operated upon by the manufacturing processes. Such components can include new and used spare parts, tools, tool kits, or process subassemblies. The number of each spare part type that is kept in inventory may vary from zero on up.

A record of spare parts inventory on hand for each facility is maintained using a computer database or other data compilation, accessed via computer network 19. "Database" is used broadly herein so that the actual databases may comprise a combination of discrete databases, sub-databases, or alternatively a single, unified database, depending upon the specific needs and efficiencies of a particular embodiment.

Foundation for Proactive Parts Inventory Planning

Cost savings and manufacturing process downtime reduction can both be achieved through proactive spare parts management based upon part demand forecasting, rather than reactive management based upon immediate need and fixed stock levels.

The first step is gaining an accurate picture of what parts are presently kept in inventory and used in the enterprise's manufacturing processes. Typical manufacturing processes may require thousands of parts to operate, and those parts requirements can change based upon changes in the processes, such as upgrades or changes in workflow, as well changes in the type or number of particular products are manufactured using the processes. A large manufacturing enterprise will typically have many processes in operation at any given time. Additionally, that same enterprise may be planning to bring still further manufacturing processes into operation in the future. Accordingly, the enterprise will have a wide variety of parts required for normal operation.

Despite differences, many of the manufacturing processes may in fact utilize the same parts under different names. For example, several otherwise-distinct manufacturing processes could all utilize a conveyor apparatus to move product through various stages of completion. During manufacture, items such as diapers and tissue paper may both require cutting and folding (or other manipulation) and may share certain components such as blades or actuators. Otherwise-disparate processes may have common maintenance needs, such as requiring a certain number of specialized electrical or plumbing toolkits to be on hand to allow for repairs in case of a breakdown. A simplified instance of commonality of parts is indicated in FIG. 1. Process A utilizes part 20 and process B utilizes part 20'. Process C is different from A and B, but utilizes both 20 and 20'.

All of these distinct parts utilized in support of differing manufacturing processes may have initially been specified under distinct part numbers, however. Such a specification leads to an inflated level of indicated parts demand since each process will need its own stable of parts. The inflation can be revealed by assigning common part identifiers to common part types. The system as disclosed herein identifies the parts independently of the process in which they are used, and uses common identifiers for common part types. The part identifiers can be part numbers or other alphanumeric designations. The parts can be identified by utilizing a generated designation assigned to each part, and this can include cross-linking disparate numbers, such as machine part numbers, enterprise-assigned numbers, and manufacturer part numbers, in a computer database. The physical parts themselves can be identified by alphanumeric tags, bar codes, or an RFID chip or chips associated with the part or containers in which the part is stored.

Once components, such as the parts 20 and 20' illustrated in FIG. 1 are identified by common designators for like components, the inventory level of each component is determined. This can be achieved by scanning a barcode or RFID tag associated with each part that is stored in the inventory stores of the facilities. Parts can be similarly scanned as they enter or leave the facilities, or are moved from inventory stores to actual use in processes. Other data entry means may be utilized as well. The identification of parts and determination of current inventory level and distribution is represented generally at step 100 of FIG. 2.

For instance, in FIG. 1, facility 16 has implemented a barcode-based system. The inventory database is updated as parts are scanned in or out of the parts store by worker 22 at facility 16 to show the parts stocking level. Facility 12 has implemented an RFID-based system, and worker 24 need only move within range of his handheld RFID scanner to register a part in the database. Facility 14 uses a large-scale RFID scanner 26 to automatically scan the entirety of parts moving in or out of its inventory store (via truck 27 in FIG. 1).

Part information can therefore be maintained to as high a level of detail as desired, both for part types and particular instances of parts. In one embodiment, for each part, the database can include information on acquisition date, manufacturer, country of origin, model number, manufacturer part number, manufacturer serial number, part location data, plant section and room, status, manufacturing asset number and sub-number, operation lead time offsets, cataloguing information, desired stocking levels and location such as at-plant or in a central store, normal issue quantity, expected plant annual usage, plant current safety stock, central stores current safety stock, and plant delivery time.

Parts Demand Forecasting

Presently, manufacturing facilities can use specialized software such as SAP® which includes plant maintenance modules allowing for planning of maintenance cycles based upon part performance data, such as mean time between failure, maintenance interval calculations, and the like. This software can also be used to track parts maintenance requests, and such data can be used to separate the breakdown demand level for parts from the non-breakdown demand level. The non-breakdown demand level represents the need for parts that are planned to be taken out of service, such as in accordance with planned maintenance cycles. The breakdown demand level reflects parts that must be kept on hand (safety stock) in order to keep a manufacturing process operational upon the otherwise-unplanned failure of a part.

Once a group of facilities have begun actively managing their individual spare parts demand levels, the data for each of the individual facilities can be cross-referenced and combined to develop a cross-plant unified demand plan for the entire enterprise. As shown in FIG. 1, calculations based upon the usage of processes A and C will result in certain demand levels for component 20, while B and C will have demand levels for component 20'. Using specialized software tools, this information can be extracted from data maintained for each facility and combined to determine the total level of breakdown demand and non-breakdown demand for each of parts 20 and 20' across the entire spectrum of facilities.

This enterprise-wide demand calculation can be used to adjust the number of spare parts kept in inventory at parts hubs and individual facilities, based upon such factors as maintenance needs, production and part lead times, changes to existing processes, addition of new processes, changes to parts by original equipment manufacturers (OEMs), and a determination of optimal spare parts capital investment. The demand calculation is represented generally at 110 in FIG. 2, and is shown at 115 as taking into account various considerations such as those listed at 115 for exemplary purposes. The demand calculation can proceed as discussed in further detail below, and may also consider other factors deemed relevant to spare parts demand planning by one skilled in the art.

Non-Breakdown Demand

The system can provide for non-breakdown demand for parts by taking into account parts lead times and ensuring that adequate parts are on-hand when the parts replacement is planned. Using this data, facilities can be transitioned to purchasing parts for planned and predicted maintenance based upon a combination of planned maintenance cycles, part performance data, and parts lead times; in one embodiment, such parts can be eliminated from the central stores in favor of ordering parts for delivery in accordance with planned needs. The predicted maintenance determination can be based upon values such as mean time between failure (MTBF), both as provided by the part supplier and as derived from actual experience using the part, and other concerns such as the environment in which the part is used.

Statistical Analysis of Breakdown Demand

For non-breakdown demand, statistical analysis can be performed to determine the best level of safety stock inventory to maintain in central stores. For example, analysis of breakdown demand may indicate that a manufacturer has enough parts on hand across facilities to keep the facilities operational in the event of a part failure. Rather than tying up capital in purchasing more of those same parts based upon a fixed purchasing target, the money can be invested in a non-depreciating asset until truly needed to purchase more breakdown parts, or re-allocated to stock parts that are needed for safety stocks, or to purchase parts to satisfy non-breakdown demand. The statistical analysis can utilize historical parts demand levels maintained in the enterprise's computer database(s).

The parts management system can be configured to evaluate parts demand and provide for reordering parts once the stock level has reached a theoretical reordering point. By providing for parts reorder at such a point, the system ensures that sufficient spare parts inventory is on-hand to meet projected breakdown demand. For a given part, the theoretical reordering point is defined as the expected demand during lead time for the part plus the theoretical safety stock. The expected demand during lead time can be determined by the average usage of the part multiplied by the lead time for the part. The theoretical safety stock represents the amount of inventory that must be kept on hand to meet above-average demand for the part. In one embodiment, the "lead times" used in calculating projected parts demand are actually part delivery time values based upon lead times provided by OEMs and a statistical analysis of actual delivery times in practice.

The theoretical safety stock is calculated using statistical theory, and is a function of the lead time for the part, the daily variance in demand for the part and the required availability for the part, typically represented as a required availability percentage (for example, the part must be available 95% of the time). Higher availability requirements require a higher level of safety stock to be maintained. The average demand, daily variance, and standard deviation of demand rate can all be calculated from historical demand data maintained in the parts and manufacturing database(s).

The spare parts inventory management system can also consider economic factors in determining spare parts ordering quantities. For instance, the cost of maintaining a parts inventory is more than simply the cost of the buying the parts. Rather, the total cost includes the actual cost of the parts, the cost of ordering the parts, and the cost of holding the parts. From these values, an economic order quantity can be calculated based upon such factors as the annual price of parts, annual ordering costs, and annual holding costs. The demand for parts can be correlated with the economies of obtaining the parts to determine an optimal ordering amount that is based upon both the needs of the manufacturing processes and the financial realities of the enterprise. Certain parts stocking decisions may require the intervention of an analyst or other personnel. In one embodiment, the spare parts inventory management system is configured to automate some parts stocking decisions and leave others for decision by plant personnel based upon parts pricing considerations and amount of use.

Proactive Spare Parts Inventory Management

In addition to integration with manufacturing management computer systems such as SAP®, the spare parts management system can be integrated with an existing engineering design system or systems to enable proactive parts management. When engineering changes are made, such as adding a new process or redesigning an existing process, the parts requirements due to the changes can be taken into account in the spare parts management system demand plan calculations, as generally illustrated in FIG. 3.

For example, assume that the engineering staff at facility 16 implements a change to process C so that it utilizes two units of part 20' rather than one as shown in FIG. 1. The engineering design change triggers a notification (indicated at 200 of FIG. 3) to the parts management system, which then assesses the changes in the engineering parts database. In an alternative embodiment, the spare parts management system periodically queries the engineering system to check for changes in parts lists and requirements. In any event, the increase in the number of part 20' is ultimately factored in to adjust the calculated demand for spares of part 20', both for breakdown and non-breakdown demand purposes.

Figure 3:
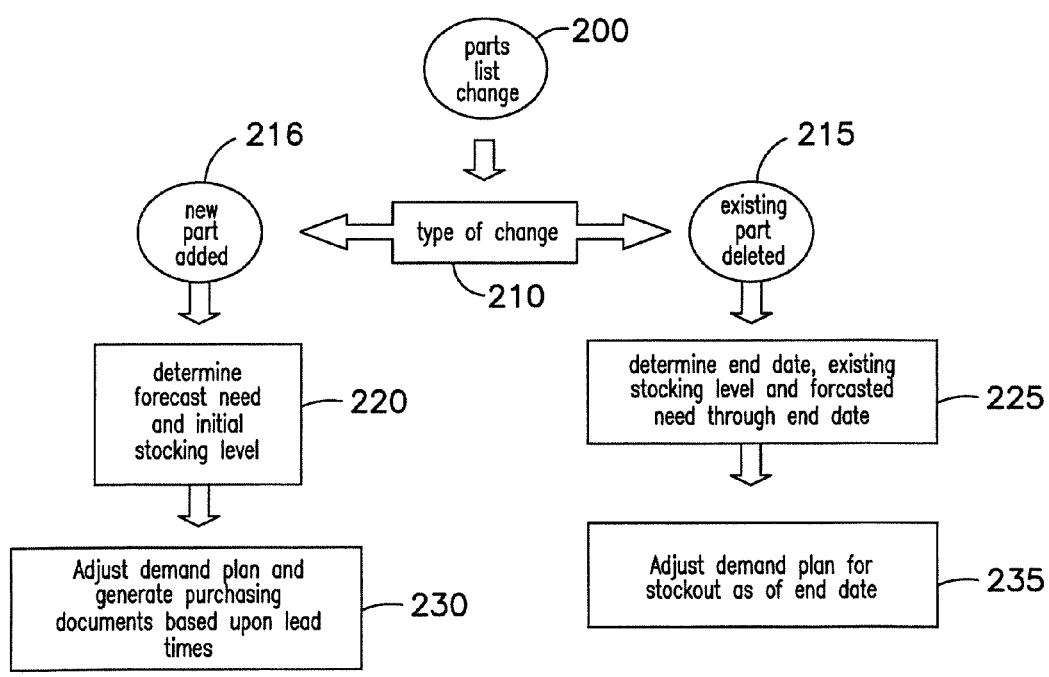
FIG. 3. represents an exemplary flow diagram of the steps for proactive parts demand management in accordance with another aspect of a spare parts inventory management system as disclosed herein.

An engineering change to an existing process may delete the use of a part from an existing process as illustrated at 215 of FIG. 3. Deletion may be due to a change in the product manufactured using the process, changes to parts by respective OEMs, or other concerns. For instance, assume that due to a product redesign, both processes B and C are altered in a manner that eliminates the use of part 20'. This change will be implemented in the engineering project database. The change to the processes will trigger a notification to the parts management system, which will evaluate the bills of material and ascertain that part 20' will no longer be required in the future. As indicated at 215, 225, and 235 of FIG. 3, the system considers the effective date of the change, the planned demand for part 20' calculated up to that point, and existing inventory stocks, to adjust the enterprise-wide demand plan to run-out the existing inventory of part 20' so that no, or minimal, excess of the part remains in the spare parts inventory. Depending upon when the part will go out of service, the adjustment to the demand plan may include reducing or canceling orders of spare part 20'; for instance, a change planned far in advance for a part not kept in stock at high levels will result in a more minor change to the demand plan than a change to be implemented sooner for a part that is highly stocked.

Engineering changes can also comprise the addition of entirely new processes as illustrated generally by 216, 220, and 230 of FIG. 3. The parts maintenance planning system can accordingly determine initial stocking requirements and take action to procure needed components. As in the case of parts addition or deletion, the parts maintenance planning system evaluates the bill of material obtained from the engineering data for the new process. Based upon existing parts inventory, the new parts required, the effective date that the new process will come on-line, and the forecast demand for parts new and old, the demand plan can be modified so that adequate stocks are available to bring the new process on line.

Adjusting Spare Parts in Inventory

Figure 2:
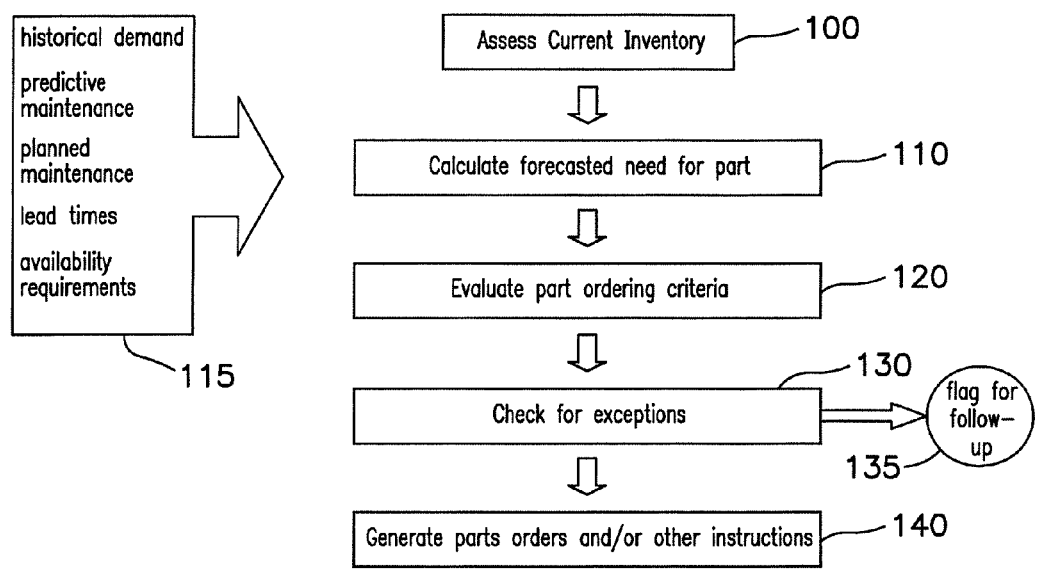
FIG. 2. represents an exemplary flow diagram for managing spare parts inventory in one embodiment of the management system.

Once a demand forecast has been obtained, at step 120 as illustrated in FIG. 2, part ordering criteria such as required parts availability, lead times, and economic considerations as discussed above are considered according to rules specified by parts management personnel. At step 130, the parts management method proceeds to check the planned part order for criteria which may indicate the particular part may require further analysis. If so, the part is flagged for follow-up as illustrated at 135 for intervention by a skilled person before ordering is to proceed. One skilled in the art will note that intervention by parts management personnel may occur at any stage in the parts management process depending upon the particular needs of the manufacturing enterprise and the criteria specified for the parts management system. Assuming no exceptions, the final step as illustrated at 140 is for parts orders or other instructions to be generated. For instance, parts can be ordered from OEMs or transferred between facilities.

Logistical Considerations

For all parts stocking decisions, lead times for the parts can also be considered, both in considering forecast demand as well as ensuring that the parts are delivered as soon as they are needed. For example, consider the case of a new process coming on-line ninety days from the date changes are implemented in the engineering system. Further assume it requires two components—one with a seven-day lead time, and a second with a thirty-day lead time. After calculating demand for the parts, the inventory management system can generate the required purchase authorization forms and place orders for the parts—ordering the first (seven-day lead time) part for delivery eighty-three days after the triggering change and ordering the second (thirty-day lead time part) for delivery sixty days after the change.

Plant demand forecasts also incorporate a determination of the optimal geographical distribution of spare parts that are on-hand, as well as ordering and delivery strategies. Certain parts may be stored in a central hub or hubs, while others are earmarked for distribution to facilities for storage. For instance, parts that are produced near facility 14 and not subject to high system-wide demand can be delivered for storage at facility 14, and then allocated for transfer of some units to the central store 10 and/or other facilities rather than direct shipment from the parts manufacturer to facility 10.

This can save on shipping time and cost. Parts that are found to be in demand system-wide may be stored at a hub for later deployment to facilities. The parts management system can take into account such factors as manufacturer lead times for parts delivery and facility lead times for parts demand in determining optimal parts positioning.

Any parts tracking currently using bar codes may instead use smart tags or UWB identification devices. As will be apparent to one skilled in the art, "Smart tags," "UWB identification devices," and "RFID tags" are all used interchangeably herein to refer to remotely-accessible data storage devices physically associated with a component. For example, instead of using a bar code to identify a part or parts kit shipped to a production facility in a parts management system, a smart tag embedded in the part or its packaging could be automatically read when it is received at the production or storage facility. The electronic code generated could either uniquely identify the part, allowing links to online part attributes, or the smart tag could be programmed to contain the needed information, such as part installation and repair history, warranty and repair instructions, and the like.

Use of RFID tag technology can provide for real-time indications of part inventory and location. In this manner, although parts are physically located in differing locations, the use of database tracking in combination with the distribution network essentially provides for an enterprise-wide central storage facility. As indicated at 26, parts shipments could be scanned as they arrive at the facility on a delivery vehicle and logged into the parts database without need for facility personnel to sort and identify the parts. Alternatively, RFID scanning by inventory personnel such as indicated by worker 24 at facility 12 could be employed.

The RFID tag, or other identifying information, can be tied to individual instances of parts to track part usage, maintenance, warranty information, or other part-specific data. Usage data for individual parts and aggregates of the same type of part can be used to determine real-world failure data such as mean time between failures. The calculated value can be compared to information provided by the manufacturer and can be used to fine-tune demand forecasts for particular facilities and the manufacturing concern as a whole.

In addition, process bills of materials may be automatically checked by verifying that proper parts have been installed, based on RFID scanners reading smart tags of the parts or parts assemblies placed in the process machinery. Parts inventory management may also be simplified by using UWB transmitters or smart tags to track the physical location of parts within the central store, manufacturing location, or other facility. With UWB devices, triangulation of an emitted signal may permit location of its source, much as in GPS systems. With RFID technology, scanners and detectors may read and record the location of numerous parts in a storage facility, either by passing a scanner through the facility or by having multiple scanners in the facility that detect objects within a short distance of the scanner. The part's location can be noted in the data maintained for the part. Based upon the part's location, the inventory level can be adjusted on an ongoing basis, whether the part is utilized in a process, in storage, in transit, or for other purposes.

In addition, smart chips or UWB devices worn or carried by the inventory and maintenance personnel may be used in lieu of a paper checklist to record the completion of general housekeeping duties, machine health checks, inventory checks, or other actions required by Good Manufacturing Practices.

In another embodiment, smart chips or UWB devices worn or carried by operators may be used to track and record actions of specific operators. For example, a smart tag identifying an operator may be read by the various input and control devices associated with an EWMA system or other HMI (human-machine interface) systems (e.g., a distributed control system) to verify the identity of the operator. If the operator enters a restricted area or physically modifies a portion a machine or moves a piece of spare parts inventory, RFID readers in certain locations of interest may track the physical presence or movement of the operator in proximity to the part and may associate that operator with changes made to the machine or inventory during that time and in that location, for possible subsequent troubleshooting or problem solving analysis.

By way of example, RFID tag and RFID readers, under the name Intellitag 500, may be purchased from Intermec Technologies Corporation of Everett, Wash., and Intermec's Amtech Systems Division in Albuquerque, N. Mex., or the RFID reader may be a Commander 320 13.56 MHz RFID reader, manufactured by Texas Instruments of Dallas, Tex. Other automatic identification and object tracking systems may be used such as RF SAW (radio frequency surface acoustic wave) technology from RF SAW, Inc. (Dallas, Tex.).

Additional Considerations in Parts Inventory Planning

A warranty management module can be integrated into the spare parts inventory management system to further streamline the repair process and optimize asset utilization. The warranty module can track warranty coverage and claims made based upon the histories of individual parts. For example, a database can contain the length or other measure of warranty coverage, what types of repairs are covered, where to ship a part for repair, and other information needed to effectuate the repair process. Certain part repairs may not be covered based upon the cause or type of failure, and the warranty module can evaluate such considerations based on stored data for the part or prompt users for more information.

When a part is removed for maintenance or due to part failure, information maintained within the database can be accessed to determine what warranty coverage, if any, is available for the part. For example, warranty coverage could depend upon the length of time from purchase for certain parts, or may depend upon the length or amount of use for others. A part may be covered for only a certain number of hours, and the warranty module can evaluate whether coverage is available based on the history of the part. If warranty coverage is available, the parts management system can then generate the requisite shipping and warranty claim documents and instructions. The part can then be shipped to the OEM or other repair service provider in accordance with warranty procedures.

In one embodiment, the spare parts inventory management system is extended by additional software enabling integration and interfacing with parts suppliers. Rather than issuing spare parts purchase orders alone, the spare parts management system provides the demand plan or portions thereof to parts OEMs. OEMs can then provide for adequate manufacturing capacity or pricing breaks based upon the demand forecast.

General Considerations

It will be apparent to one skilled in the art of parts inventory management that the methods and systems disclosed herein can be implemented utilizing computer software. Such software includes object-oriented and other programming languages, as well as cross-application programming frameworks such as the .NET® framework of the Microsoft Corporation. One or more structured or unstructured databases can be accessed to store, retrieve, and change information according to rules and calculations in accordance with the methodologies disclosed herein. The parts inventory management system disclosed herein can be implemented on a single computer or across several computer systems, and may make use of or change data stored in and by other unrelated computer systems depending upon the optimal configuration for a particular enterprise. The parts inventory management system may be implemented in and practiced using a combination of discrete sub-modules or as a unified piece of software. Furthermore, the data utilized in operating the spare parts management system can be transmitted via private network, the public internet, or a combination of networks.

Various data input and output schemes and devices can be used in combinations that best suit the manufacturing facilities supported by the system described herein. For instance, a web-based front-end to the database is used in one embodiment to allow users to access and modify parts and availability data and requirements. The database can be accessed via any computing device appropriately linked to a network with access to the parts inventory management system. These devices can include personal computers, terminals and servers, and portable computing devices such as PDAs. Parts information can be entered manually, via RFID scans of a tag or tags associated with parts, via barcode scans, or by any other conversion of parts identification data into machine-readable format to associate a particular part with data stored in the computer system.

Decisions on stocking requirements, purchase authorizations, and lead times can be based upon rules entered into the computer system, and be completely or partially automated and present options or authorizations via a computer interface for management approval/alteration. In one embodiment, parts are divided into categories based upon usage, cost, and potential savings and the degree of management by the system disclosed herein is varied accordingly. For instance, reordering extremely low-cost or standardized items such as bolts or washers may be managed by individual facilities since the savings potential from using demand management as disclosed herein is minimal. For other parts, management intervention may be prompted by the forecast demand meeting certain predefined criteria such as illustrated at 130 and 135 of FIG. 2 and discussed above. For example, if a part demand forecast is exceedingly high, exceedingly low, or does not fit expected models, the purchase or stocking decision can be brought to the attention of parts analysts or managers.

What is claimed:

1. A method for managing enterprise-wide component inventory, comprising the steps of:
   a. identifying a plurality of components, each comprising a part or tool used in support of at least one manufacturing process;
   b. maintaining at least one inventory store of the components;
   c. calculating an enterprise-wide demand plan for each of the components; and
   d. adjusting the number of each component maintained in the inventory store based upon the demand plan.

2. The method of claim 1, wherein the step of calculating a demand plan includes responding to a trigger initiated by a change in a component bill of material for a manufacturing process.

3. The method of claim 2, wherein the change comprises deletion of a component from a process, and wherein calculating an enterprise-wide demand plan comprises providing for the inventory store of the deleted component to run out.

4. The method of claim 2, wherein the change comprises addition of a previously-unused component to a process as of an effective date of service, and wherein calculating an enterprise-wide demand plan comprises providing for an initial stocking level of the previously-unused component so that at least one spare of the previously-unused component is available to meet demand as of the effective date of service of the previously-unused component.

5. The method of claim 1, wherein maintaining at least one inventory store includes storing a plurality of components at a central location, and wherein calculating an enterprise-wide demand plan includes determining a safety stock level for the components based upon statistical analysis of prior demand, including lead times for the components.

6. The method of claim 1, further comprising: tracking a history of a component, and wherein calculating an enterprise-wide demand plan for the component comprises utilizing the tracked history.

7. The method of claim 6, wherein calculating an enterprise-wide demand plan for the component includes utilizing data comprising a frequency of failure of the component.

8. The method of claim 6, wherein tracking a history of a component includes maintaining a record of at least one individual instance of the component.

9. The method of claim 8, wherein maintaining a record includes maintaining a history of repairs to the individual instance of the component.

10. The method of claim 8, wherein maintaining a record comprises identifying a physical location of the individual instance of the component.

11. The method of claim 8, wherein tracking a history of a component includes scanning at least one RFID device associated with the individual instance of the component.

12. The method of claim 5, wherein the central store has a turns ratio greater than 1.

13. The method of claim 12, wherein the central store has a turns ratio greater than 2.5.

14. A method for managing enterprise-wide component inventory, comprising the steps of:
   a. identifying demand values for spare parts used in support of a plurality of manufacturing processes located at multiple facilities;
   b. maintaining at least one inventory store of the spare parts;
   c. separating breakdown demand for each spare part from non-breakdown demand for each spare part;
   d. determining an average demand level for each spare part;
   e. calculating a theoretical safety stock level for each spare part based upon an analysis of the statistical distribution of breakdown demand values for the part, the planned delivery time for the part, and an availability requirement for the part;

f. calculating a forecast demand for each spare part based upon the average demand level, planned delivery times, and theoretical safety stock level;

g. placing orders for each spare part such that the inventory store contains sufficient numbers of each spare part to meet the calculated forecast demand; and h. placing orders for each spare part such that sufficient parts are delivered to facilities in accordance with planned delivery times to meet non-breakdown demand.

15. The method of claim 14, wherein the at least one inventory store is a central hub serving multiple manufacturing facilities, and wherein the parts orders are placed such that the central hub contains sufficient numbers of each spare part to meet calculated demand for all the facilities associated with the hub.

16. The method of claim 14, further comprising adjusting the demand values for spare parts in response to a change in process parts requirements discontinuing use of a part, and wherein calculating a forecast demand comprises adjusting the forecast demand so as to run out inventory of the discontinued part.

17. The method of claim 14, further comprising adjusting the demand values in response to a change in process parts requirements adding a new part, and wherein calculating a forecast demand comprises adjusting the forecast demand so as to provide for an initial stocking level of the new part.

18. The method of claim 14, wherein identifying demand values comprises using data associated with an enterprise resource planning computer system.

19. A method for managing enterprise-wide component inventory, comprising the steps of:

a. monitoring at least one identification device associated with a component, the component comprising a spare part or tool used in support of a manufacturing process;

b. determining a physical location of the component in response to the monitoring; and c. adjusting inventory data for the component based upon the location of the component.

20. The method of claim 19, wherein monitoring includes scanning an RFID tag associated with a component that is in use in a manufacturing process.

21. The method of claim 19, wherein monitoring includes scanning RFID tags associated with a plurality of stored components.

22. A method for managing enterprise-wide component inventory, comprising the steps of:

a. identifying a plurality of components, each comprising a part or tool used in support of at least one manufacturing process;

b. maintaining warranty data for each component;

c. evaluating the status of each based on component data, including the history of the component and the warranty data; and d. providing for repair of a component in accordance with the warranty data for the component.

23. The method of claim 22, wherein identifying includes monitoring at least one identification device associated with the component.

24. The method of claim 23, wherein the identification device comprises a smart tag emitting a radio frequency signal, and identifying comprises receiving, from a scanning device, the emitted radio frequency signal.

25. The method of claim 22, wherein providing for repair includes generating repair request documents and shipping documents for sending the component to a repair service provider when warranty coverage is available.

* * * * *